United States Patent
Huang

(10) Patent No.: US 8,248,015 B2
(45) Date of Patent: Aug. 21, 2012

(54) CIRCUIT FOR CONTROLLING ROTATION SPEED OF FAN OF ELECTRONIC DEVICE

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 370 days.

(21) Appl. No.: 12/613,468

(22) Filed: Nov. 5, 2009

(65) Prior Publication Data

US 2010/0327792 A1    Dec. 30, 2010

(30) Foreign Application Priority Data

Jun. 24, 2009   (CN) .......................... 2009 1 0303588

(51) Int. Cl.
*G05B 5/00*   (2006.01)

(52) U.S. Cl. .......................... 318/471; 318/490; 318/369
(58) Field of Classification Search .................. 318/471, 318/490, 369, 268
See application file for complete search history.

(56) References Cited

U.S. PATENT DOCUMENTS 3,667,245 A * 6/1972 Till et al. .......................... 62/180
6,037,732 A * 3/2000 Alfano et al. .................. 318/471

* cited by examiner

*Primary Examiner* — Karen Masih
(74) *Attorney, Agent, or Firm* — Altis Law Group, Inc.

(57) ABSTRACT

A circuit for controlling a rotation speed of a fan of an electronic device according to a temperature of the electronic device. The circuit senses the temperature of the electronic device, and outputs a voltage changing with the sensed temperature. The rotation speed of the fan changes with the voltage. The circuit slows the rotation speed of the fan down when the sensed temperature of the electronic device is decreased.

13 Claims, 2 Drawing Sheets

CIRCUIT FOR CONTROLLING ROTATION SPEED OF FAN OF ELECTRONIC DEVICE

BACKGROUND

1. Technical Field

The present disclosure relates to controlling circuits, and more particularly to a circuit for controlling rotation speed of a fan of an electronic device.

2. Description of Related Art

Various electronic devices, such as computers, game players, etc., generate heat when operating. These electronic devices may be damaged if the heat is not dissipated in a timely fashion. Generally, fans are used to facilitate removal of heat to keep the temperature of the electronic devices within safe temperature ranges. The temperatures of the electronic devices may be changeable. It is not energy efficient if the fans speed cannot be adjusted according to the temperatures of the electronic device.

DETAILED DESCRIPTION

Figure 1:
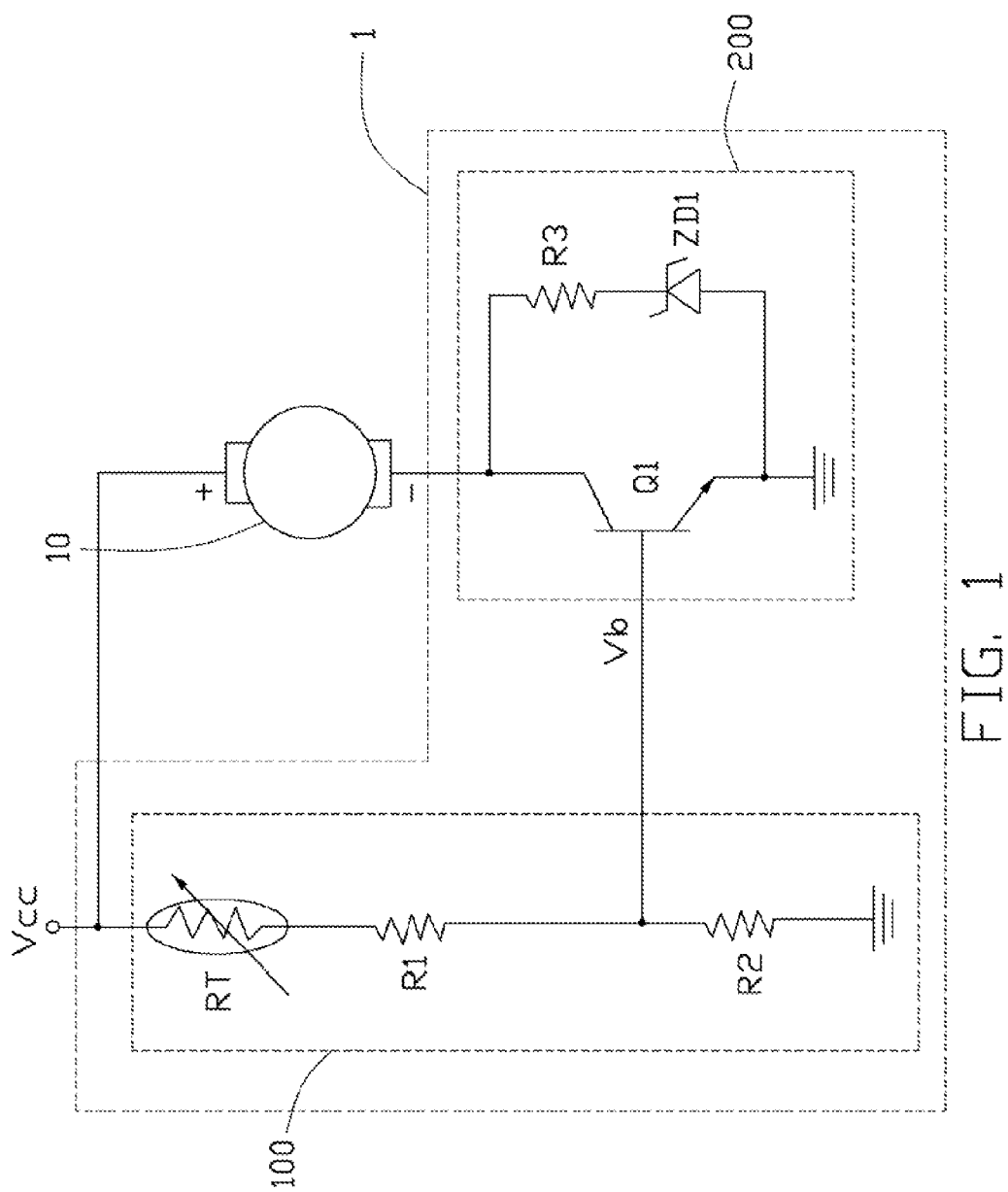
FIG. 1 is a first embodiment of a circuit for controlling a rotation speed of a fan of an electronic device.

Referring to FIG. 1, a first embodiment of a circuit 1 is to control a rotation speed of a fan 10 of an electronic device. The circuit 1 includes a temperature sensor 100, and a rotation speed adjusting circuit 200.

The temperature sensor 100 includes a thermistor RT, and a voltage divider connected between the thermistor RT and ground. The voltage divider includes two resisters R1 and R2 connected in series between the thermistor RT and ground. The thermistor RT is a negative temperature coefficient (NTC) thermistor.

The rotation speed adjusting circuit 200 includes an electronic switch Q1, a resistor R3, and a zenzer diode ZD1. In this embodiment, the electronic switch Q1 is a bipolar junction transistor (BJT) having a base connected to a node between the two resistors R1 and R2, a collector connected to a negative terminal of the fan 10, and an emitter grounded. A positive terminal of the fan is connected to a power supply Vcc. An anode of the zenzer diode ZD1 is grounded. A cathode of the zenzer diode ZD1 is connected to the collector of the electronic switch Q1 via the resistor R3. In other embodiments, the electronic switch Q1 may be a metal oxide semiconductor field effect transistor (MOSFET).

The thermistor RT senses a temperature of the electronic device. The base of the electronic switch Q1 receives a first voltage Vb from the voltage divider. The first voltage Vb is determined according to the equation: $Vb = Vcc \ast r2/(rt+r1+r2)$, wherein rt, r1, and r2 are resistances of the thermistor RT, the resistor R1, and the resistor R2 respectively. The resistance rt of the thermistor RT decreases with increasing temperature of the electronic device. When the resistance rt of the thermistor RT decreases, the first voltage Vb increases, which makes a base current of the electronic switch Q1 increase. It can be determined from the output characteristic of BJTs that a collector current of the electronic switch Q1 increases with increasing of the base current. Current flowing through the fan 10 increases since the current flowing through the fan 10 is equal to the collector current of the electronic switch Q1. Therefore, the fan 10 is driven to rotate faster.

On the contrary, when the temperature of the electronic device decreases, the resistance rt of the thermistor RT increases. The first voltage Vb decreases to decrease the base current of the electronic switch Q1. The current flowing through the fan 10 decreases to slow down the rotation speed of the fan 10.

Figure 2:
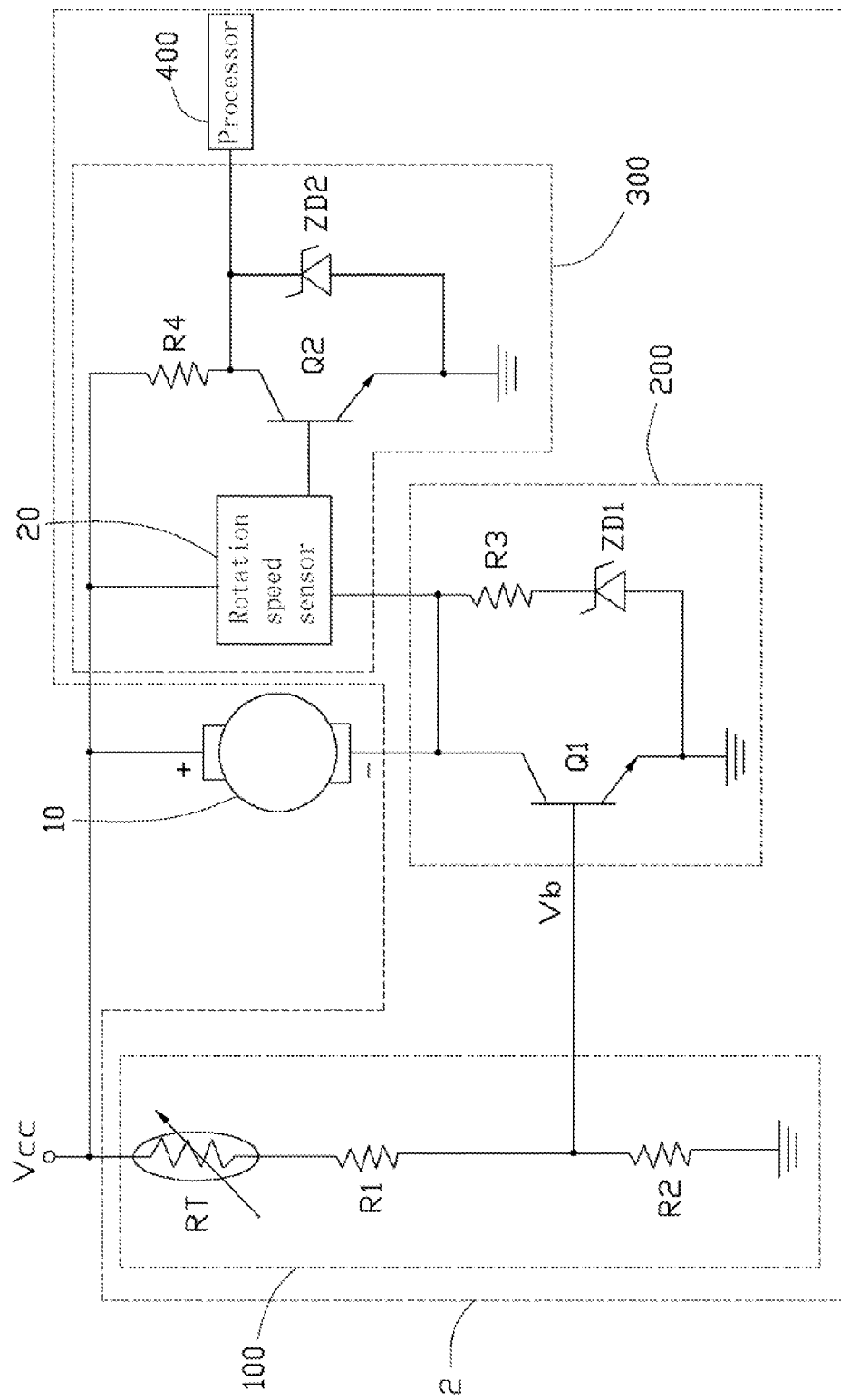
FIG. 2 is a second embodiment of a circuit for controlling the rotation speed of the fan of the electronic device.

Referring to FIG. 2, a second embodiment of a circuit 2 is to detect and control the rotation speed of the fan 10 of the electronic device. The circuit 2 includes the temperature sensor 100, the rotation speed adjusting circuit 200, and further includes a rotation speed detector 300, and a processor 400.

The rotation speed detector 300 includes a rotation speed sensor 20, a resistor R4, an electronic switch Q2, and a zener diode ZD2. A first input of the rotation speed sensor 20 is connected to the positive terminal of the fan 10. A second input of the rotation speed sensor 20 is connected to the negative terminal of the fan 10. The electronic switch Q2 is a BJT having a base connected to an output of the rotation speed sensor 20, a collector connected to the first input of the rotation speed sensor 20 via the resistor R4, and an emitter grounded. An anode of the zener diode ZD2 is connected to the emitter of the electronic switch Q2, and a cathode of the zener diode ZD2 is connected to the collector of the electronic switch Q2. The collector of the electronic device Q2 is connected to the processor 400. In other embodiments, the electronic switch Q2 may be a MOSFET.

The rotation speed detector 20 monitors the rotation speed of the fan 10 by detecting the current flowing through the fan 10, and outputs a second voltage to the base of the electronic switch Q2. The electronic switch Q2 outputs a monitoring signal according to the second voltage. The monitoring signal indicates changes in the rotation speed of the fan 10. For example, when the rotation speed of the fan 10 increases, the second voltage increases. A base current of the electronic switch Q2 increases. The collector of the electronic switch Q2 then outputs the monitoring signal to the processor 400, indicating that the rotation speed of the fan 10 increases. In this embodiment, the zener diode ZD2 is used to protect the electronic switch Q2 from being damaged by an over voltage between the collector and the emitter of the electronic switch Q2.

The processor 400 receives and processes the monitoring signal. For example, the processor 400 may convert the monitoring signal to a display signal to indicate the changes in the rotation speed of the fan 10 on a monitor of the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A circuit for controlling a rotation speed of a fan of an electronic device according to a temperature of the electronic device, the circuit comprising:

a temperature sensor to sense the temperature of the electronic device, and output a first voltage according to the sensed temperature, the first voltage changing with change of the sensed temperature; and a rotation speed adjusting circuit comprising:
- a first electronic switch having a first terminal connected to the temperature sensor to receive the first voltage, a second terminal connected to the fan to drive the rotation speed of the fan, and a third terminal grounded; and
- a first zenzer diode comprising an anode grounded, and a cathode connected to the second terminal of the first electronic switch via a first resistor;

wherein currents at the first and second terminals of the first electronic switch change with the changing of the first voltage.

2. The circuit of claim 1, wherein the temperature sensor comprises:
- a thermistor sensing the temperature of the electronic device; and
- a voltage divider connected between the thermistor and ground to output the first voltage.

3. The circuit of claim 2, wherein the voltage divider comprises two second resisters connected in series between the thermistor and ground, the first voltage is outputted from a node between the two second resisters.

4. The circuit of claim 2, wherein the thermistor is a negative temperature coefficient thermistor, of which resistance increases with the temperature of the electronic switch decreasing.

5. The circuit of claim 4, wherein the first voltage and the currents at the first and second terminals of the first electronic switch decrease with the resistance of the thermistor increasing.

6. The circuit of claim 1, wherein the first electronic switch is a bipolar junction transistor having a base, a collector, and an emitter functioning as the first, second and third terminals of the first electronic switch respectively.

7. The circuit of claim 1, further comprising:
- a rotation speed detector monitoring the rotation speed of the fan, and outputting a monitoring signal indicating changes in the rotation speed of the fan; and
- a processor receiving and processing the monitoring signal.

8. The circuit of claim 7, wherein the processor converts the monitoring signal to a display signal to indicate changes in the rotation speed of the fan.

9. The circuit of claim 7, wherein the rotation speed detector comprises:
- a rotation speed sensor detecting the rotation speed of the fan by detecting a current flowing through the fan, and outputting a second voltage according to the detected rotation speed; and
- a second electronic switch comprising a first terminal to receive the second voltage, a second terminal outputting the monitoring signal, and a third terminal grounded, the second terminal of the second electronic switch is connected to a power supply via a third resistor.

10. The circuit of claim 7, wherein the second voltage increases with the rotation speed of the fan increasing.

11. The circuit of claim 9, wherein the rotation speed detector further comprises a second zenzer diode having a cathode connected to the second terminal of the second electronic switch, and an anode grounded.

12. The circuit of claim 9, wherein the second electronic switch is a bipolar junction transistor having a base, a collector, and an emitter functioning as the first, second and third terminals of the second electronic switch respectively.

13. A circuit for controlling a rotation speed of a fan of an electronic device according to a temperature of the electronic device, the circuit comprising:
- a temperature sensor to senses the temperature of the electronic device, and output a voltage changing with the sensed temperature; and
- a rotation speed adjusting circuit comprising:
  - an electronic switch having a first terminal connected to the temperature sensor to receive the voltage, a second terminal to drive the fan to rotate at a rotation speed corresponding to the voltage, and a third terminal grounded; and
  - a zenzer diode comprising an anode grounded, and a cathode connected to the second terminal of the electronic switch via a resistor;

wherein the rotation speed of the fan changes with the current of the second terminal of the electronic switch.

* * * * *